United States Patent
Yeager et al.

(10) Patent No.: US 10,047,630 B2
(45) Date of Patent: Aug. 14, 2018

(54) AIR STREAM MIXING INNER DIAMETER (ID) CAVITY

(71) Applicant: United Technologies Corporation, Hartford, CT (US)

(72) Inventors: William Yeager, Jupiter, FL (US); Donna Clough, Tolland, CT (US)

(73) Assignee: United Technologies Corporation, Farmington, CT (US)

(*) Notice: Subject to any disclaimer, the term of this patent is extended or adjusted under 35 U.S.C. 154(b) by 496 days.

(21) Appl. No.: 14/441,564

(22) PCT Filed: Dec. 17, 2013

(86) PCT No.: PCT/US2013/075743
§ 371 (c)(1),
(2) Date: May 8, 2015

(87) PCT Pub. No.: WO2014/105522
PCT Pub. Date: Jul. 3, 2014

(65) Prior Publication Data
US 2015/0285095 A1    Oct. 8, 2015

Related U.S. Application Data

(60) Provisional application No. 61/747,249, filed on Dec. 29, 2012.

(51) Int. Cl.
*F01D 25/12* (2006.01)
*F01D 25/16* (2006.01)
(Continued)

(52) U.S. Cl.
CPC ............. *F01D 25/12* (2013.01); *F01D 9/041* (2013.01); *F01D 9/065* (2013.01); *F01D 25/162* (2013.01);
(Continued)

(58) Field of Classification Search
CPC ........ F01D 25/12; F01D 25/14; F01D 25/162; F01D 25/30; F01D 9/065; F01D 25/24; F01D 25/26
See application file for complete search history.

(56) References Cited

U.S. PATENT DOCUMENTS 4,321,007 A    3/1982    Dennison et al.
7,055,305 B2    6/2006    Baxter et al.
(Continued)

FOREIGN PATENT DOCUMENTS

WO            00/22281 A1    4/2000

OTHER PUBLICATIONS

The International Search Report dated Apr. 9, 2014 for International Application No. PCT/US13/75743.
(Continued)

*Primary Examiner* — Justin Seabe
*Assistant Examiner* — Brian P Wolcott
(74) *Attorney, Agent, or Firm* — Kinney & Lange, P.A.

(57) ABSTRACT

A method of mixing airflow within an inner diameter (ID) mixing chamber of a turbine exhaust case (TEC) includes directing pressurized airflow into the ID mixing chamber. Cooling airflow is directed radially inward via a tube and is then expelled into the ID mixing chamber in a circumferential direction for mixing with the pressurized airflow.

15 Claims, 5 Drawing Sheets

(51) Int. Cl.
*F01D 25/30* (2006.01)
*F01D 9/04* (2006.01)
*F01D 9/06* (2006.01)

(52) U.S. Cl.
CPC ........ *F01D 25/30* (2013.01); *F05D 2250/185* (2013.01); *Y02T 50/675* (2013.01)

(56) References Cited

U.S. PATENT DOCUMENTS

| | | |
|---|---|---|
| 2003/0180141 A1 | 9/2003 | Kress et al. |
| 2005/0050898 A1 | 3/2005 | Noda |
| 2005/0229602 A1 | 10/2005 | Whiting |
| 2009/0238678 A1* | 9/2009 | Nyamu .................. F01D 5/084 415/116 |
| 2010/0132374 A1 | 6/2010 | Manteiga et al. |
| 2010/0322759 A1 | 12/2010 | Tanioka |
| 2011/0079019 A1* | 4/2011 | Durocher ............... F01D 5/082 60/796 |
| 2011/0081237 A1* | 4/2011 | Durocher ................ F01D 9/06 415/173.1 |
| 2012/0227371 A1 | 9/2012 | Johnson et al. |

OTHER PUBLICATIONS

The European Search Report dated Dec. 10, 2015 for European Application No. 13868835.3.

\* cited by examiner

AIR STREAM MIXING INNER DIAMETER (ID) CAVITY

BACKGROUND

The present invention is directed to turbine exhaust cases (TECs) utilized in gas turbine engines, and in particular to architectures for mixing air streams within TECs.

Turbine Exhaust Cases (TECs) typically comprise structural frames that support the very aft end of a gas turbine engine. In aircraft applications, the TEC can be utilized to mount the engine to the aircraft airframe. In industrial gas turbine applications, the TEC can be utilized to couple the gas turbine engine to an electrical generator. A typical TEC comprises an outer ring that couples to the outer diameter case of the low pressure turbine, an in inner ring that surrounds the engine centerline so as to support shafting in the engine, and a plurality of struts connecting the inner and outer rings.

The components of the TEC are exposed to very high temperatures associated with the gas path. Various approaches and architectures are employed to handle the high temperatures. For example, components of the TEC may utilize materials capable of handling the high temperature associated with the gas path, may utilize various shielding materials (e.g., heat shields, fairings) to surround and protect structural components from the high temperatures associated with the gas path, and/or may cool air to regulate the temperature of the various TEC components. Typically, cooling airflow provided by a heat exchanger is communicated via an outer diameter of the TEC, which provides cooling air flow to the inner ring and components associated with the inner ring.

SUMMARY

A method of mixing airflow within an inner diameter (ID) mixing chamber of a turbine exhaust case (TEC) includes directing pressurized airflow into the ID mixing chamber. Cooling airflow is directed radially inward via a tube and is then expelled into the ID mixing chamber in a circumferential direction for mixing with the pressurized airflow.

A turbine exhaust case (TEC) includes a frame portion that includes an outer ring, an inner ring disposed radially inward of the outer ring. The TEC further includes a plurality of hollow struts connecting the outer ring to the inner ring, wherein an inner diameter (ID) cavity is formed between the inner ring and a bearing compartment disposed radially inward of the inner ring. A tube located within at least one hollow strut directs cooling airflow radially inward to the ID cavity, wherein the tube includes a slot positioned to direct cooling airflow circumferentially into the ID cavity. A second passage located radially inward of the ID cavity directs pressurized airflow into the ID cavity for mixing with the cooling airflow.

A mixing architecture for a turbine exhaust case includes a bearing assembly and a frame inner ring. The bearing assembly extends circumferentially around a centerline axis. The frame inner ring extending circumferentially around a centerline axis and is located radially outward of the bearing assembly. An inner diameter (ID) mixing chamber is located between the bearing assembly and the frame inner ring. A passage provides pressurized airflow to the ID mixing chamber. A tube connected to the bearing assembly provides cooling airflow radially inward to the ID cavity, wherein the tube includes a slot positioned to direct cooling airflow circumferentially into the ID cavity.

DETAILED DESCRIPTION

Figure 1:
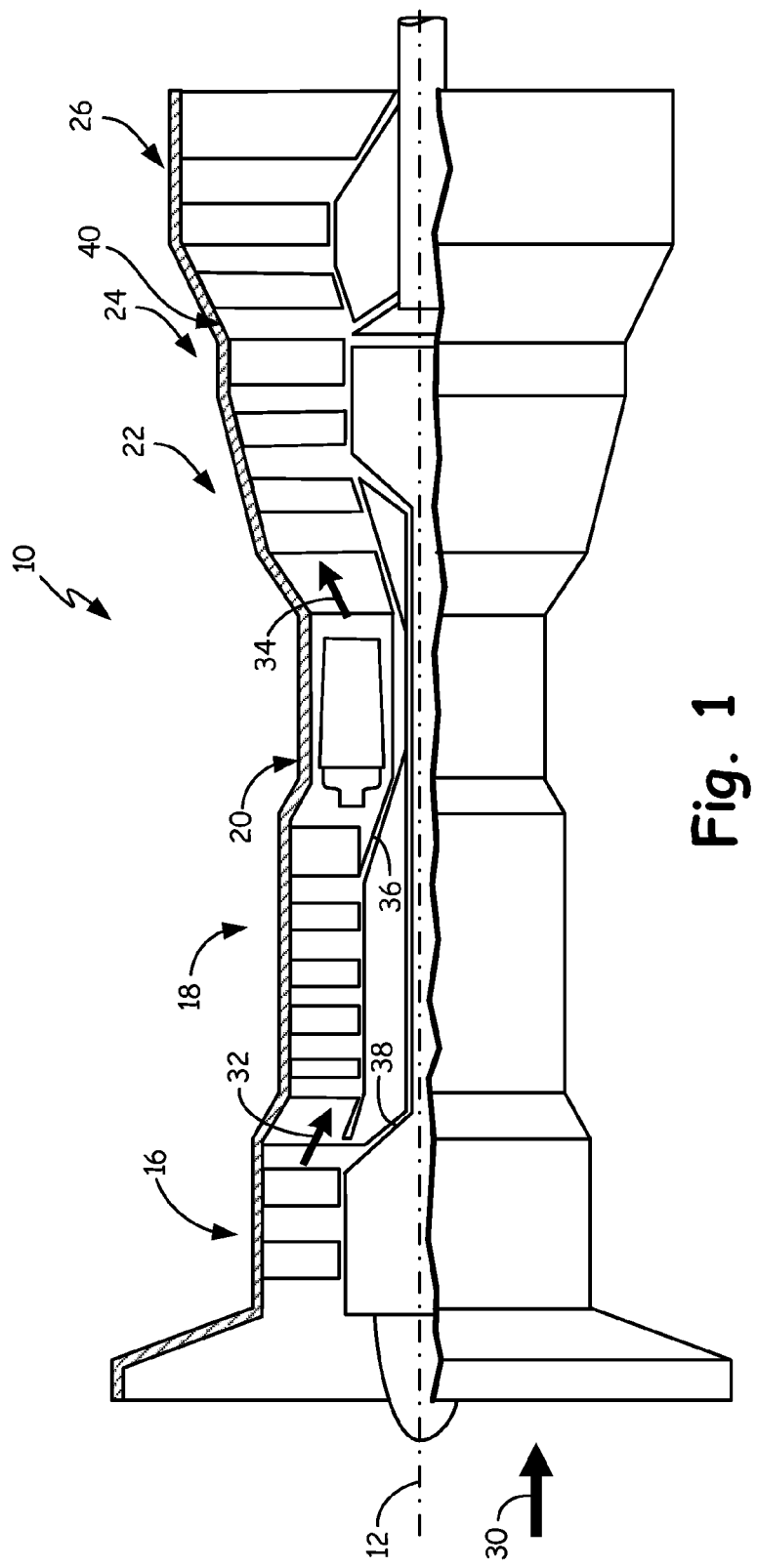
FIG. 1 is a side sectional schematic view of an industrial gas turbine engine having a turbine exhaust case.

FIG. 1 is a side partial sectional schematic view of gas turbine engine 10. In the illustrated embodiment, gas turbine engine 10 is an industrial gas turbine engine circumferentially disposed about a central, longitudinal axis or axial engine centerline axis 12 as illustrated in FIG. 1. Gas turbine engine 10 includes, in series order from front to rear, low pressure compressor section 16, high pressure compressor section 18, combustor section 20, high pressure turbine section 22, and low pressure turbine section 24. In some embodiments, power turbine section 26 is a free turbine section disposed aft of the low pressure turbine 24.

As is well known in the art of gas turbines, incoming ambient air 30 becomes pressurized air 32 in the low and high pressure compressor sections 16 and 18. Fuel mixes with pressurized air 32 in combustor section 20, where it is burned. Once burned, combustion gases 34 expand through high and low pressure turbine sections 22 and 24 and through power turbine section 26. High and low pressure turbine sections 22 and 24 drive high and low pressure rotor shafts 36 and 38 respectively, which rotate in response to flow of combustion gases 34 and thus rotate the attached high and low pressure compressor sections 18 and 16. Power turbine section 26 may, for example, drive an electrical generator, pump, or gearbox (not shown).

Turbine Exhaust Case (TEC) 40 is positioned between low pressure turbine section 24 and power turbine section 26. In the embodiment shown in FIG. 1, TEC 40 may be referred to as Low Pressure Turbine Exhaust Case (TEC) 40, but turbine exhaust cases may be used in various segments of gas turbine engine 10. TEC 40 defines a flow path for gas exhausted from low pressure turbine section 24 that is conveyed to power turbine 26. TEC 40 also provides structural support for gas turbine engine 10 so as to provide a coupling point for power turbine section 26. TEC 40 is therefore rigid and structurally strong. The present invention relates generally to a cooling architecture for maintaining components of TEC 40 within allowed operating parameters.

It is understood that FIG. 1 provides a basic understanding and overview of the various sections and the basic operation of an industrial gas turbine engine. It will become apparent to those skilled in the art that the present application is applicable to all types of gas turbine engines, including those with aerospace applications. Similarly, although the present disclosure is described with reference to a cooling architecture for TEC 40, the present invention is applicable to other components of gas turbine engines, such as intermediate cases, mid-turbine frames and the like.

Figure 2A:
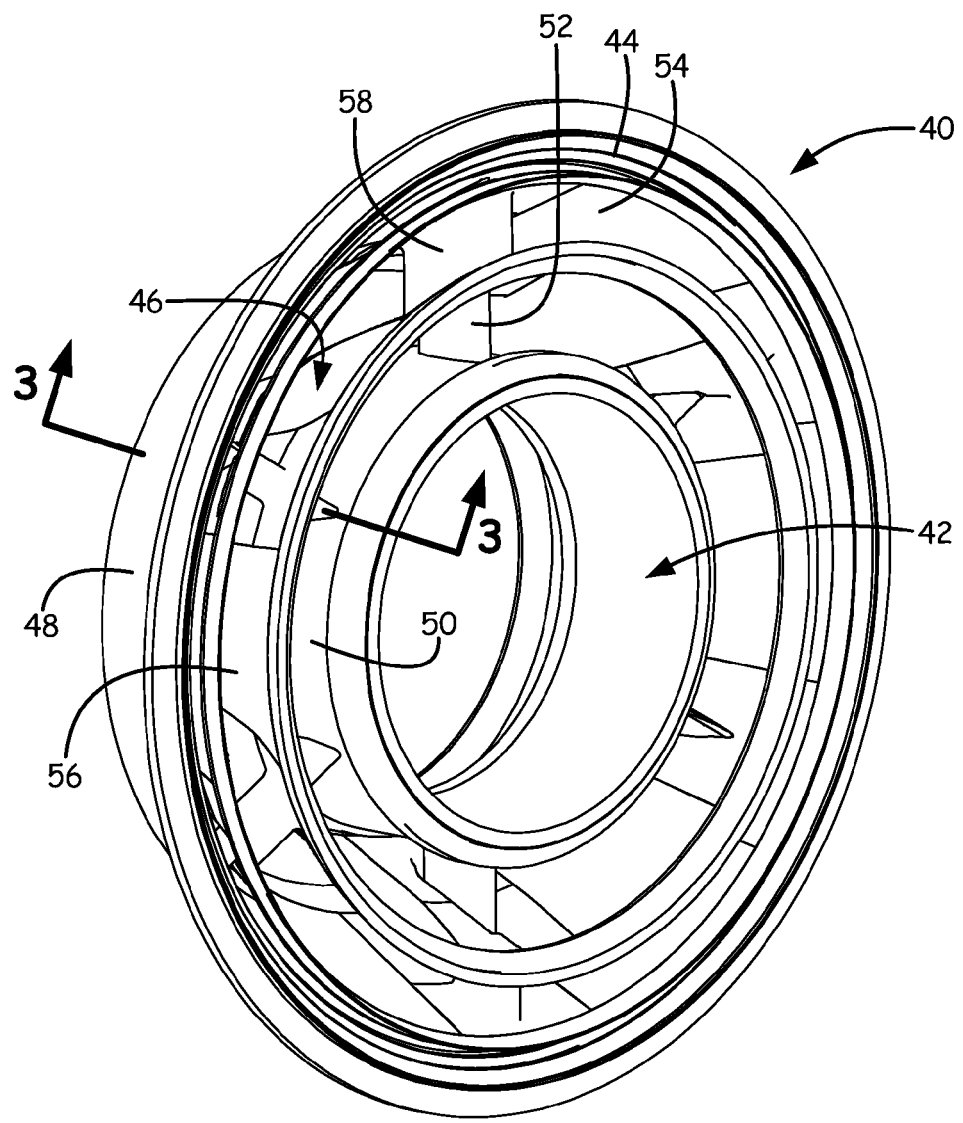
FIG. 2A is a perspective view of a turbine exhaust case in which a ring-strut-ring fairing is assembled with a ring-strut-ring frame.
Figure 2B:
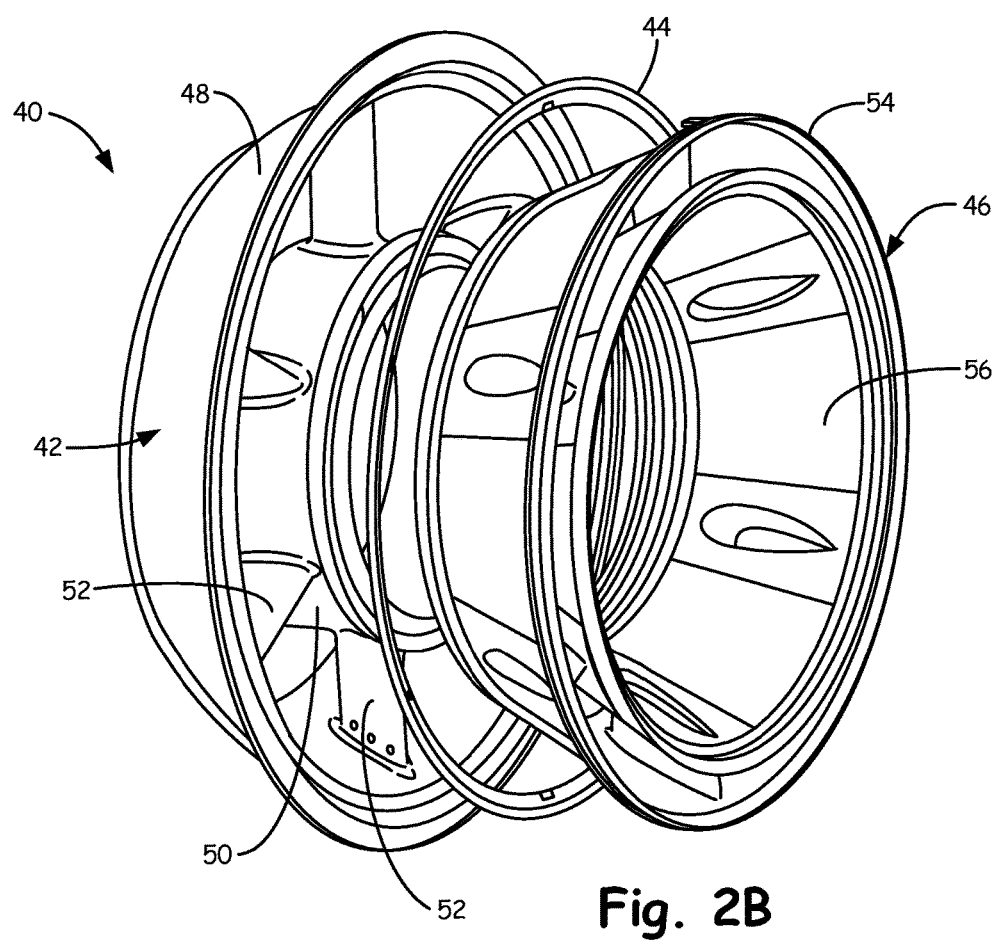
FIG. 2B is an exploded view of the turbine exhaust case of FIG. 2A showing the frame, the fairing and a circumferential stop ring.

FIG. 2A shows a perspective view of Low Pressure Turbine Exhaust Case (TEC) 40, which includes frame 42, annular mount 44, and fairing 46. FIG. 2B, which is discussed concurrently with FIG. 2A, shows an exploded view of TEC 40 showing annular mount 44 disposed between fairing 46 and frame 42. Frame 42 includes frame outer ring 48, frame inner ring 50, and frame struts 52. Fairing 46 includes fairing outer ring 54, fairing inner ring 56, and fairing struts 58.

Frame 42 comprises a ring-strut-ring structure that defines a gas path between frame outer ring 48 and frame inner ring 50. Fairing 46 also comprises a ring-strut-ring structure that is mounted within frame 42 to line the gas path and protect frame 42 from high temperature exposure. In one embodiment, fairing 46 can be built around frame 42, and in another embodiment, frame 42 is built within fairing 46.

Frame 42 comprises a stator component of gas turbine engine 10 (FIG. 1) that is typically mounted between low pressure compressor section 24 and power turbine section 26. In the embodiment shown, frame outer ring 48 of frame 42 is conically shaped, while frame inner ring 50 is cylindrically shaped. Frame outer ring 48 is connected to frame inner ring 50 via frame struts 52. Frame outer ring 48, frame inner ring 50 and frame struts 52 form a portion of the gas flow path through gas turbine engine 10 (FIG. 1). Specifically, frame outer ring 48 and frame inner ring 50 define the outer and inner radial boundaries of an annular flow path between low pressure turbine section 24 and power turbine section 26 (FIG. 1), while frame struts 52 intermittently interrupt the annular flow path.

Fairing 46 is adapted to be disposed within frame 42 between frame outer ring 48 and frame inner ring 50. Fairing outer ring 54 and fairing inner ring 56 of fairing 46 have generally conical shapes, and are connected to each other by fairing struts 58. Fairing outer ring 54, fairing inner ring 56, and fairing struts 58, form a liner for the portion of the gas flow path through frame 42. Specifically, fairing struts 58 encase frame struts 52, while fairing outer ring 54 and fairing inner ring 56 line inward facing surfaces of frame outer ring 48 and frame inner ring 50, respectively.

Figure 3A:
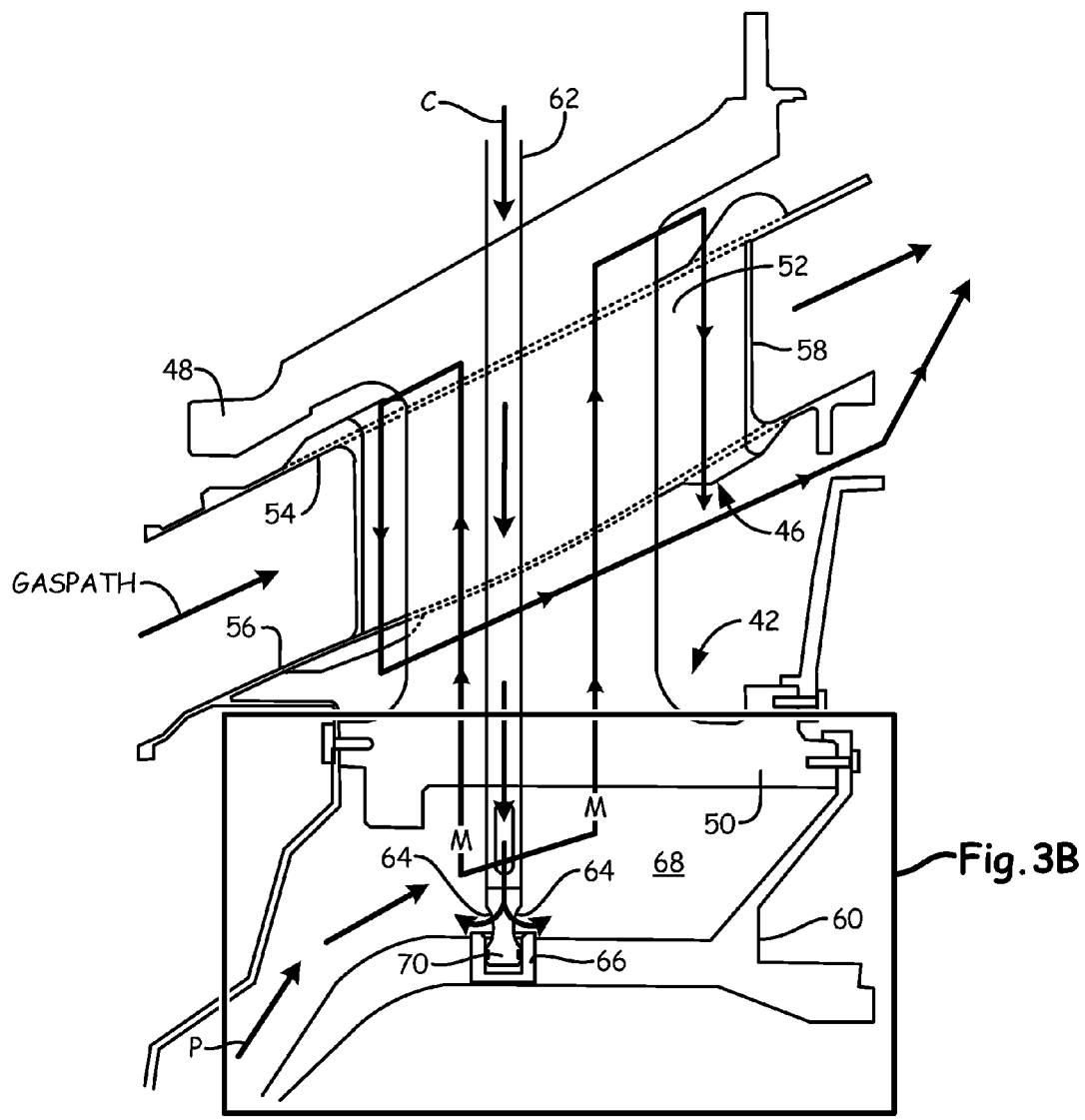
FIG. 3A is a cross-sectional view of the turbine exhaust case taken along line 3-3 shown in FIG. 2A.

FIG. 3A is a cross-sectional view of the turbine exhaust case taken along line 3-3 shown in FIG. 2A.

As described with respect to FIGS. 2A and 2B, frame 42 includes frame outer ring 48, frame inner ring 50, and a plurality of frame struts 52 connecting outer ring 48 to inner ring 50. Fairing 46 includes fairing outer ring 54, fairing inner ring 56 and fairing strut 58. The components making up fairing 46 define the gas path through which hot gas from the combustor flows, and provide thermal insulation for frame outer ring 48, frame inner ring 50 and fairing struts 52, which are disposed within hollow fairing struts 58. Bearing assembly 60 is disposed radially inward of frame inner ring 50 to support a rotor assembly (not shown) and to communicate loads from the rotor assembly to frame inner ring 50. Struts 52 are connected to both frame inner ring 50 and frame outer ring 48, and therefore communicate loads from frame inner ring 50 to frame outer ring 48. Passage/tube 62 extends through frame outer ring 48, frame strut 52, and frame inner ring 50 for attachment to bearing assembly 60.

To mitigate the effect of high gaspath temperatures, cooling airflow C is flowed over components of frame 42 to provide cooling. In the embodiment shown in FIG. 3A, cooling airflow C is provided radially inward via tube/passage 62. In particular, tube 62 is located within the hollow portion of strut 52 and extends through frame outer case 48 and frame inner case 52 and is attached to bearing assembly 60. Tube 62 is fastened to bearing assembly 60 via fastener section 66 (associated with bearing assembly 60) and fastener section 70 associated with tube 62. In one embodiment, fastener sections 66 and 70 are threaded openings that allow tube 62 to be secured to bearing assembly 60.

Cooling airflow C directed radially inward through tube 62 is expelled into inner diameter (ID) mixing chamber 68 via openings 64 in tube 62. Within ID mixing chamber 68, cooling airflow C is mixed with pressurized airflow P to provide a mixed airflow for communication to components within TEC 40 for cooling. The increased pressure provided by pressurized airflow P increases the outflow margin, and thus improves cooling to TEC 40. In one embodiment, pressurized airflow P is bled from a compressor stage (e.g., $9^{th}$ stage giggle tube flow, bled for compressor stability but typically dumped overboard or injected into the gaspath) and provided via a radially inward path to ID mixing chamber 68. The mixed airflow M (i.e., combination of pressurized airflow P and cooling airflow C) is communicated radially outward via frame struts 52 to an OD cavity (not shown) to provide cooling to frame struts 52 and frame outer ring 48. By mixing cooling airflow C with pressurized airflow P, the outflow margin associated with the cooling system is increased. The proportion of cooling airflow C and pressurized airflow P is selected (as described below) to satisfy desired outflow margin requirements.

To provide effective mixing between cooling airflow C and pressurized airflow P, tube 62 and in particular openings 64 are configured to add turbulence and/or rotation to cooling airflow C. In the embodiment shown in FIG. 3A, cooling airflow C is shown being expelled from both sides of tube 62. In other embodiments, such as the one shown in FIG. 3B, cooling airflow C is expelled from only one side of tube 62 and in the same direction as the windage created by the rotating components associated with bearing assembly 60. In both embodiments, cooling airflow C is expelled in a direction perpendicular with a radially extending axis associated with TEC 40, such that the cooling airflow C is circulated around ID mixing chamber 68. Although not easily seen in the cross-sectional view shown in FIGS. 3A and 3B, ID mixing chamber 68 extends circumferentially around bearing assembly 60. Thus, by directing cooling airflow C in a direction perpendicular with a radially extending axis, the cooling airflow C is directed along the circumferential length of ID mixing chamber 68.

Figure 3B:
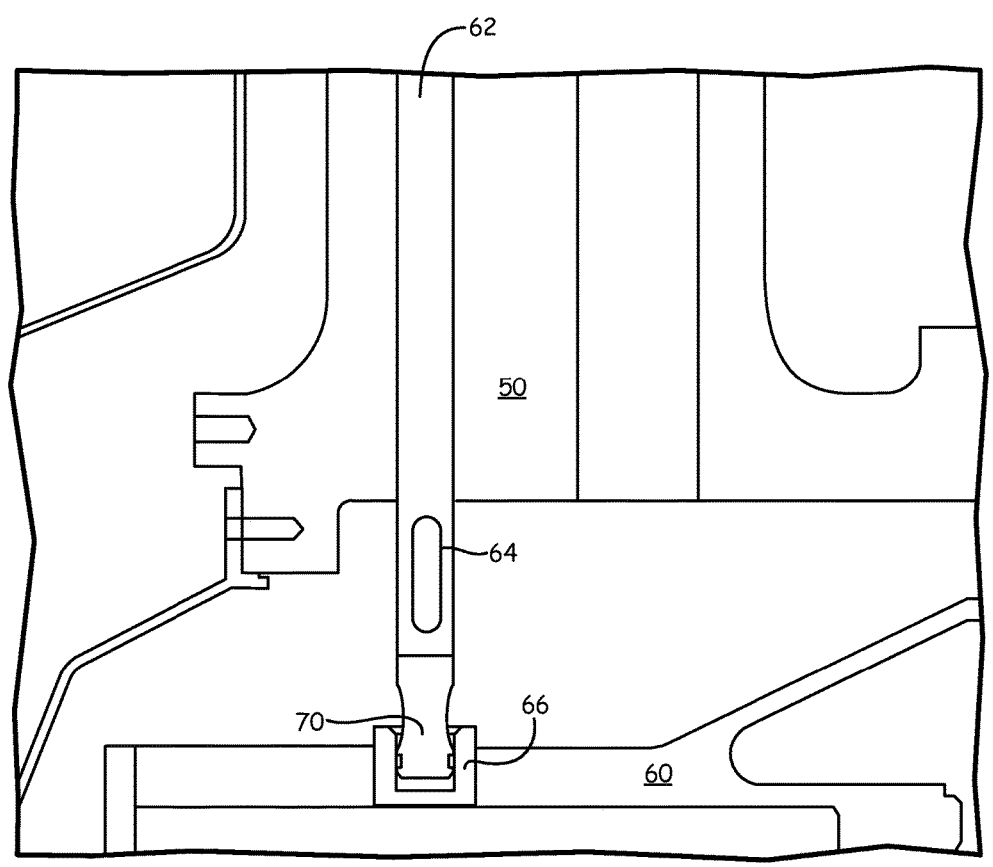
FIG. 3B is an enlarged view of the inner diameter mixing chamber and the tube supplying cooling airflow to the (ID) mixing chamber.

FIG. 3B is an enlarged view of inner diameter mixing chamber 68 and tube 62 supplying cooling airflow to (ID) mixing chamber 68. In the embodiment shown in FIG. 3B, only the portion of tube 62 extending through frame inner ring 50 and into bearing assembly 60 is shown. Slot 64 is a "race-track" (i.e., oval shaped) slot machined onto one side of tube 62 to expel cooling airflow from tube 62 into ID mixing chamber 68. The geometry and/or size of slot 64 may be modified to vary flow characteristics of the cooling airflow expelled into ID mixing chamber 68. For example, modifying the size of slot 64 varies the flow of cooling airflow C supplied into ID mixing chamber 68. In this way, the proportion of cooling airflow C mixed with pressurized airflow P can be selectively adjusted to meet desired outflow margin requirements.

In addition, slot 64 is positioned on one side of tube 62 to expel cooling airflow C in a circumferential direction (i.e., perpendicular to the radial direction in which cooling airflow is supplied from the outer diameter to the inner diameter). With respect to the embodiment shown in FIG. 3B, slot 64 is located such that cooling airflow is expelled in the same direction as windage generated by rotating components. For example, looking forward from an aft position, windage is generated in a clockwise direction and some of the created windage migrates to ID mixing chamber 68 where it flows in a clockwise direction circumferentially around ID mixing chamber 68. By expelling the cooling airflow C in the same direction as the created windage, the velocity of the expelled cooling airflow C is not decreased by resistance caused by windage. As a result of orienting cooling airflow in the same direction as the windage, cooling airflow circulates around ID mixing chamber 68. By positioning slot 64 on a side of tube 62, cooling airflow is directed in circumferential direction (i.e., perpendicular to the radial direction in which the cooling air is delivered from the outer diameter to the inner diameter). Orienting slot 64 in the right direction results in the cooling airflow expelled from tube 62 being directed in the same direction as the created windage.

Also shown in more detail in FIG. 3B is the threaded connection between fastener portion 70 of tube 62 and threaded portion 66 of bearing assembly 60. To install, tube 62 is inserted through frame 42, including frame outer ring 48, frame struts 52 and frame inner ring 50. Portion 70 of tube 62 is threaded into portion 66 of bearing assembly 60 and tightened until slot 64 is aligned in a desired direction and/or position. Threads allow for radial adjustments to tube 62, such that slots 64 may be oriented in a desired direction. In addition, radial adjustments allow the position of tube 62 to be adjusted in a radial direction (i.e. radially outward or radially inward).

In this way, the present disclosure describes a system and method of providing cooling airflow to an ID mixing chamber. Further, the present disclosure directs the cooling airflow in the same direction as windage created by rotating components, to aid in distributing the cooling airflow around the ID mixing chamber and mixing with pressurized airflow. The resulting air mixed within the ID mixing chamber is directed radially outward to provide cooling to other components associated with the TEC. The proportion of cooling airflow mixed with pressurized airflow is selected to meet desired outflow requirements, wherein the proportion may be modified by varying the size of the slots and/or the orientation of the slots.

The following are non-exclusive descriptions of possible embodiments of the present invention.

A method of mixing airflow within an inner diameter (ID) mixing chamber of a turbine exhaust case (TEC) includes directing pressurized airflow into the ID mixing chamber. Cooling airflow is directed radially inward via a tube and is then expelled into the ID mixing chamber in a circumferential direction for mixing with the pressurized airflow.

The method of the preceding paragraph can optionally include, additionally and/or alternatively, any one or more of the following features, configurations and/or additional components:

wherein the cooling airflow is expelled into the ID mixing chamber in a circumferential direction that is the same as a direction of windage created in the ID mixing chamber by rotating components associated with the TEC;

wherein the tube includes one or more slots for directing cooling airflow into the ID mixing chamber;

wherein the circumferential direction of the expelled cooling airflow is approximately perpendicular to the radially inward direction the cooling airflow is directed within the tube;

wherein the cooling airflow and pressurized airflow is mixed in a proportion selected to meet outflow margin requirements.

A turbine exhaust case (TEC) includes a frame portion that includes an outer ring, and an inner ring disposed radially inward of the outer ring. The TEC further includes a plurality of hollow struts connecting the outer ring to the inner ring, wherein an inner diameter (ID) cavity is formed between the inner ring and a bearing compartment disposed radially inward of the inner ring. A tube located within at least one hollow strut directs cooling airflow radially inward to the ID cavity, wherein the tube includes a slot positioned to direct cooling airflow circumferentially into the ID cavity. A passage located radially inward of the ID cavity directs pressurized airflow into the ID cavity for mixing with the cooling airflow.

The TEC of the preceding paragraph can optionally include, additionally and/or alternatively, any one or more of the following features, configurations and/or additional components:

wherein the cooling airflow is directed in a circumferential direction that is the same as a direction of windage created in the ID cavity by rotating components associated with the TEC;

wherein the tube includes a plurality of slots for directing cooling airflow into the ID cavity;

wherein the circumferential direction of the cooling airflow expelled from the slot is approximately perpendicular to the radially inward direction the cooling airflow is directed within the tube;

wherein the tube is secured to the bearing assembly;

wherein the pressurized airflow is bleed air from a compressor stage;

wherein the ID cavity extends circumferentially around the bearing assembly;

wherein a tube providing cooling airflow is provided in each of the plurality of struts, where the plurality of struts are circumferentially spaced from one another;

wherein the slot has a size selected to adjust a proportion of mixing of the cooling airflow with the pressurized airflow to meet outflow requirements.

A mixing architecture for a turbine exhaust case includes a bearing assembly and a frame inner ring. The bearing assembly extends circumferentially around a centerline axis. The frame inner ring extending circumferentially around a centerline axis and is located radially outward of the bearing assembly. An inner diameter (ID) mixing chamber is located between the bearing assembly and the frame inner ring. A passage provides pressurized airflow to the ID mixing chamber. A tube connected to the bearing assembly provides cooling airflow radially inward to the ID cavity, wherein the tube includes a slot positioned to direct cooling airflow circumferentially into the ID cavity.

The mixing architecture of the preceding paragraph can optionally include, additionally and/or alternatively, any one or more of the following features, configurations and/or additional components:

wherein the cooling airflow is directed in a circumferential direction that is the same as a direction of windage created in the ID cavity by rotating components associated with the bearing assembly;

wherein the tube includes a plurality of slots for directing cooling airflow into the ID cavity;

wherein the plurality of slots have a size selected to meet desired outflow requirements;

wherein the circumferential direction of the cooling airflow expelled from the slot is approximately perpendicular to the radially inward direction the cooling airflow is directed within the tube;

wherein the pressurized airflow is bleed air from a compressor stage.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of mixing cooling air within an inner diameter (ID) mixing chamber of a turbine exhaust case (TEC), the method comprising:
   directing pressurized airflow into the ID mixing chamber;
   directing cooling airflow radially inward via a tube through the TEC; and
   expelling the cooling airflow from the tube into the ID mixing chamber in a circumferential direction for mixing with the pressurized airflow, wherein the cooling airflow is expelled into the ID mixing chamber only in a circumferential direction that is the same as a direction of windage created in the ID mixing chamber by rotating components associated with the TEC.

2. The method of claim 1, wherein the tube includes one or more slots for directing cooling airflow into the ID mixing chamber.

3. The method of claim 1, wherein the circumferential direction of the expelled cooling airflow is perpendicular to the radially inward direction the cooling airflow is directed within the tube.

4. The method of claim 1, wherein the cooling airflow and pressurized airflow is mixed in a proportion selected to meet outflow margin requirements.

5. A turbine exhaust case (TEC) comprising:
   a frame portion that includes an outer ring, an inner ring disposed radially inward of the outer ring, and a plurality of hollow struts connecting the outer ring to the inner ring, wherein an inner diameter (ID) cavity is formed between the inner ring and a bearing compartment disposed radially inward of the inner ring;
   a tube located within at least one hollow strut that directs cooling airflow radially inward from outside the TEC to the ID cavity, wherein the tube includes a slot positioned to direct cooling airflow circumferentially into the ID cavity, wherein the cooling airflow is directed only in a circumferential direction that is the same as a direction of windage created in the ID cavity by rotating components associated with the TEC; and
   a passage located radially inward of the ID cavity that directs pressurized airflow into the ID cavity for mixing with the cooling airflow.

6. The turbine exhaust case of claim 5 wherein the circumferential direction of the cooling airflow expelled from the slot is perpendicular to the radially inward direction the cooling airflow is directed within the tube.

7. The turbine exhaust case of claim 5, wherein the tube is secured to a bearing assembly.

8. The turbine exhaust case of claim 5, wherein the pressurized airflow is bleed air from a compressor stage.

9. The turbine exhaust case of claim 5 wherein the ID cavity extends circumferentially around a bearing assembly.

10. The turbine exhaust case of claim 5, wherein a tube providing cooling airflow is provided in each of the plurality of hollow struts and wherein the plurality of hollow struts are circumferentially spaced from one another.

11. The turbine exhaust case of claim 5, wherein the slot has a size selected to adjust a proportion of mixing of the cooling airflow with the pressurized airflow to meet outflow requirements.

12. A mixing architecture for a turbine exhaust case, the mixing architecture comprising:
   a bearing assembly extending circumferentially around a centerline axis;
   a frame inner ring extending circumferentially around a centerline axis and located radially outward of the bearing assembly;
   an inner diameter (ID) mixing chamber located between the bearing assembly and the frame inner ring;
   a passage for providing pressurized airflow to the ID mixing chamber;
   a tube connected to the bearing assembly for providing cooling airflow radially inward to the ID cavity, wherein the tube includes a slot positioned to expel cooling airflow circumferentially into the ID cavity, wherein the cooling airflow is directed only in circumferential direction that is the same as a direction of windage created in the ID cavity by rotating components associated with the bearing assembly.

13. The mixing architecture of claim 12, wherein the slot has a size selected to meet desired outflow requirements.

14. The mixing architecture of claim 12, wherein the circumferential direction of the expelled cooling airflow is perpendicular to the radially inward direction the cooling airflow is directed within the tube.

15. The mixing architecture of claim 12, wherein the pressurized airflow is bleed air from a compressor stage.

* * * * *